March 10, 1936.  J. R. PARKHILL  2,033,645
DISTRIBUTING SYSTEM FOR CLASSIFYING OBJECTS
Filed Sept. 21, 1931  4 Sheets-Sheet 3
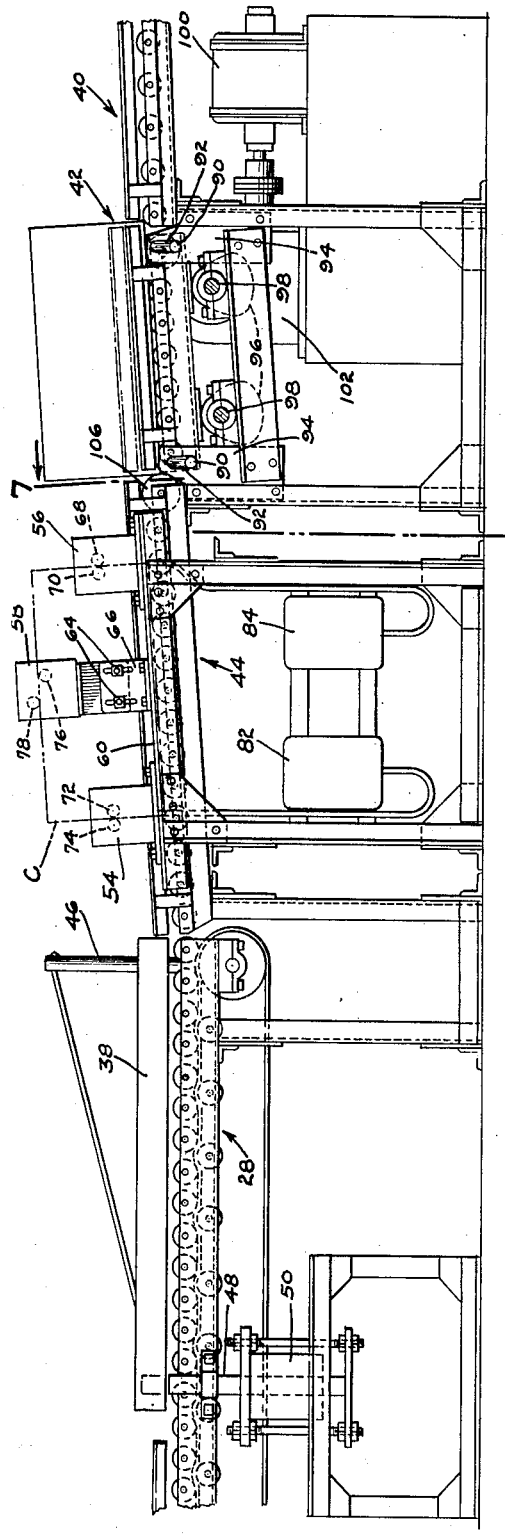
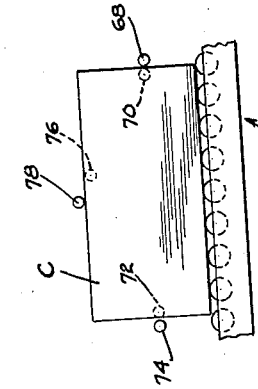
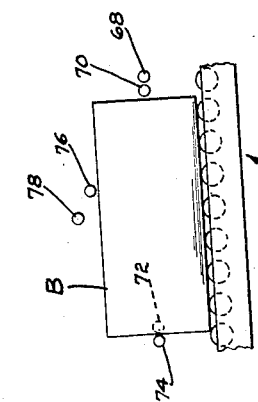
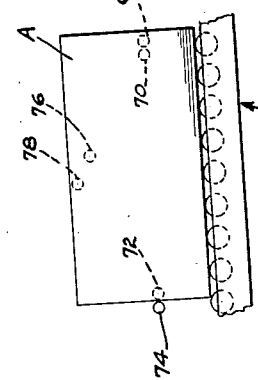
INVENTOR
JAMES R. PARKHILL
By Paul, Paul & Moore
ATTORNEYS March 10, 1936.  J. R. PARKHILL  2,033,645
DISTRIBUTING SYSTEM FOR CLASSIFYING OBJECTS
Filed Sept. 21, 1931   4 Sheets-Sheet 4

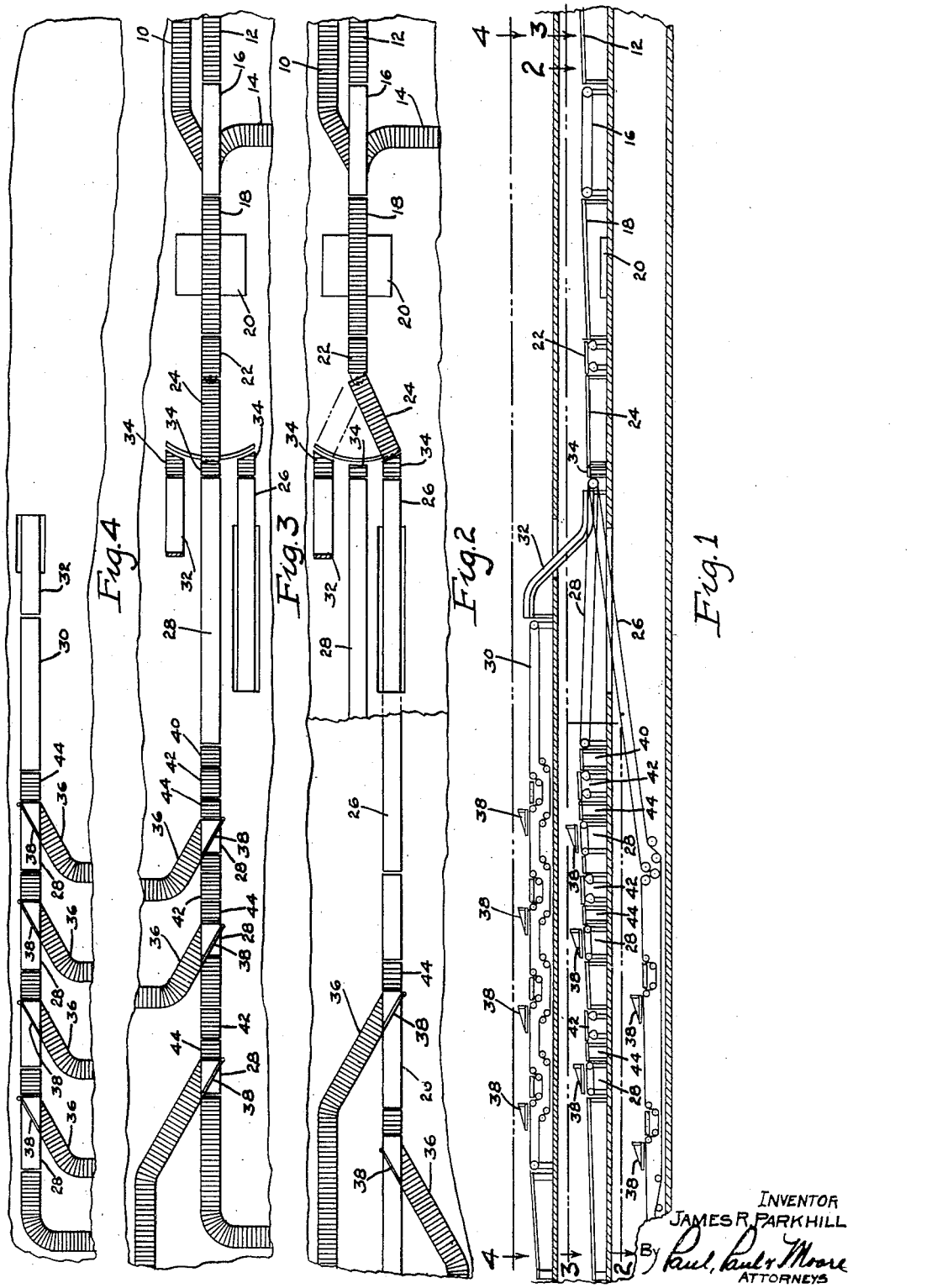
March 10, 1936.  J. R. PARKHILL  2,033,645
DISTRIBUTING SYSTEM FOR CLASSIFYING OBJECTS
Filed Sept. 21, 1931  4 Sheets-Sheet 1

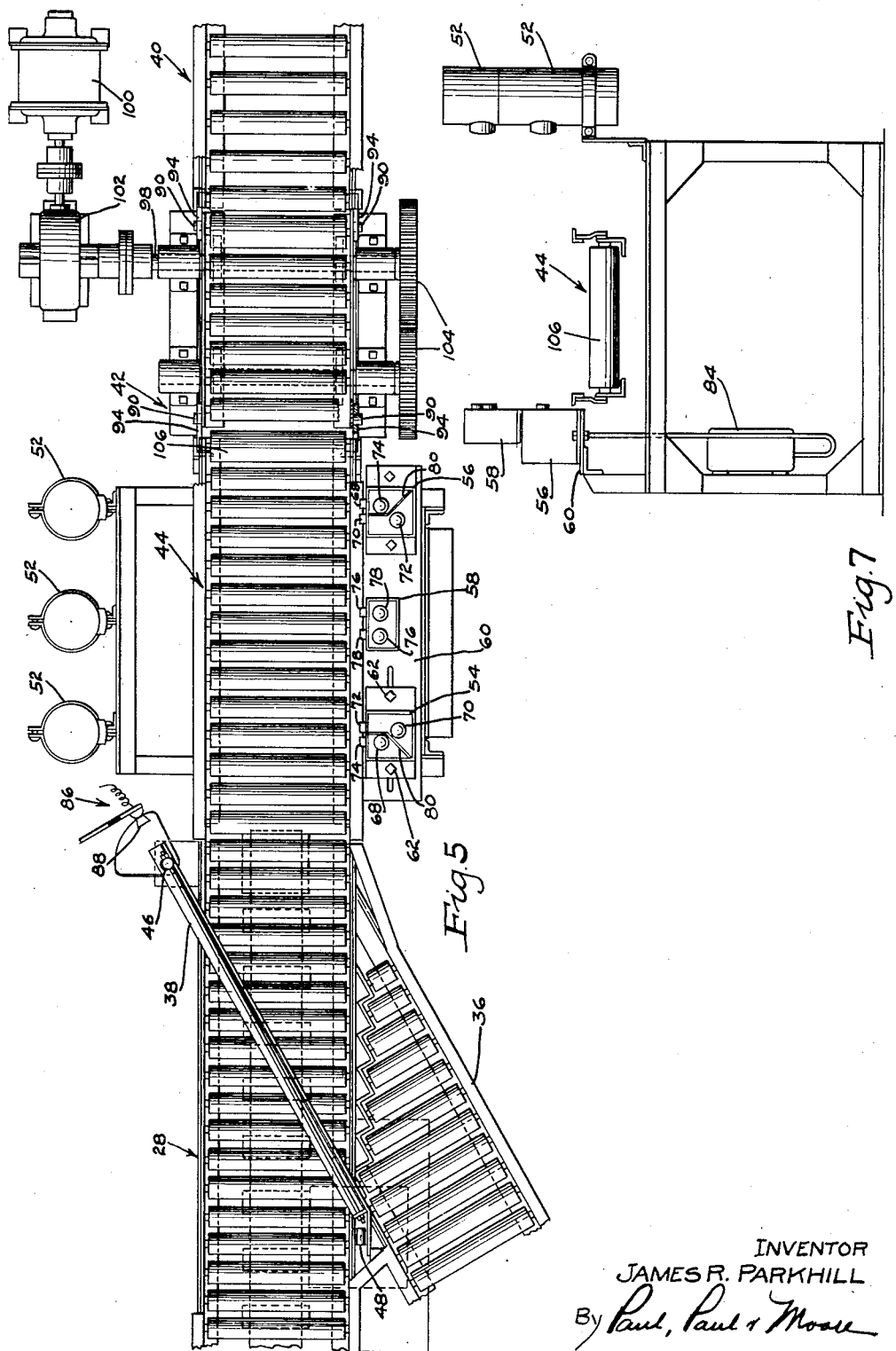

INVENTOR
JAMES R. PARKHILL
By Paul, Paul & Moore
ATTORNEYS

Patented Mar. 10, 1936

2,033,645

UNITED STATES PATENT OFFICE 2,033,645

DISTRIBUTING SYSTEM FOR CLASSIFYING OBJECTS

James R. Parkhill, Ellwood City, Pa., assignor to Mathews Conveyer Company, Ellwood City, Pa., a corporation of Pennsylvania Application September 21, 1931, Serial No. 564,116

9 Claims. (Cl. 209—111)

This invention relates to conveying apparatus and has for its principal object the provision of mechanism for automatically and selectively deflecting commodities by size or shape.

Another object of the invention is to provide a conveying system, including a main conveyer and a plurality of branch conveyers leading therefrom, with means for automatically deflecting commodities from said main conveyer to a selected branch conveyer, said means being controlled by one or more dimensions of the commodity or by the shape or outline of the commodity.

Another object of the invention is to provide conveying apparatus with deflecting mechanism operable by photo-electric means controlled by the size or shape of a commodity to be deflected.

Still another object of the invention is to provide apparatus of the character set forth including deflecting mechanism operated entirely by photo-electric means or by such means in combination with one or more switches operated by the commodity to be deflected.

Among the many advantages of the invention may be mentioned the elimination of all pilot devices, markers, or other selection devices, the simplification of dispatchers' duties, reduction in cost due to elimination of return systems, and unvarying operation accomplished at the proper time by the commodity itself.

Other objects of the invention and further advantages will become apparent as the description proceeds.

In the accompanying drawings, I have shown for the purpose of illustration a conveying system and apparatus embodying my invention, including two forms of deflector control and operating mechanism. It is to be understood that the drawings are illustrative, merely, and that the invention is not limited to the details of construction therein shown. Such details may be varied within wide limits and equivalents substituted without departing from the spirit and scope of the invention as defined in the appended claims.

In the drawings:

Fig. 1 is a sectional view through a building showing, diagrammatically, a conveying system embodying my invention installed on three floors of the building;

Fig. 2 is a sectional view on line 2—2 of Fig. 1, showing, in plan, a portion of the conveying system located on the first and second floors;

Fig. 3 is a sectional view on line 3—3 of Fig. 1, showing the conveying system located on the second floor;

Fig. 4 is a sectional view on line 4—4 of Fig. 1, showing a portion of the conveying system located on the third floor;

Fig. 5 is a plan view of a portion of the main conveyer adjacent a deflecting station;

Fig. 6 is a view in side elevation of the portion of the conveying apparatus shown in Fig. 5;

Fig. 7 is a sectional view on line 7—7 of Fig. 6;

Figure 11:
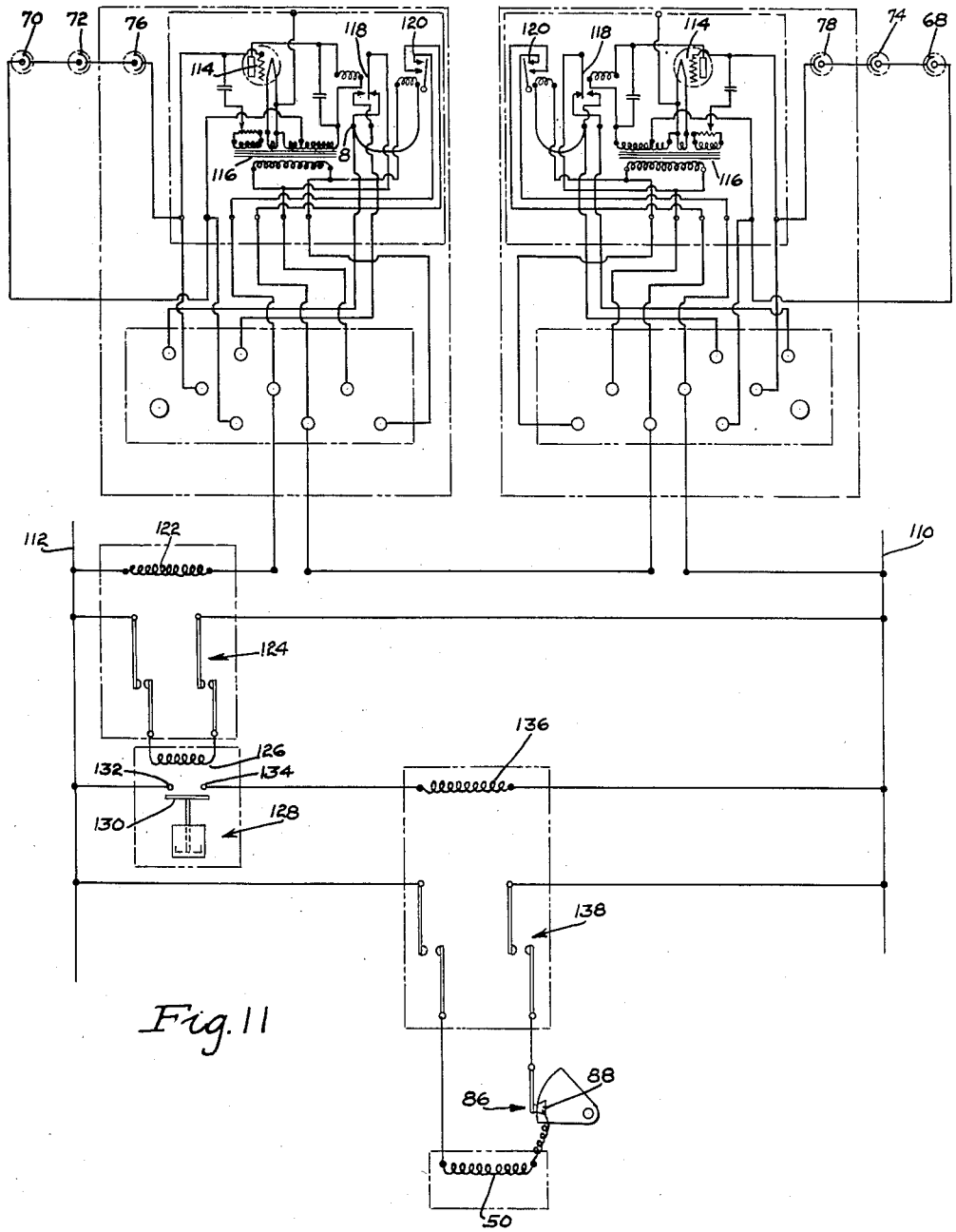

Figs. 8, 9, and 10 are diagrammatic views illustrating three different sizes of commodities and their positions relative to the photo-electric cells;

Fig. 11 is a wiring diagram of the circuits for controlling the deflector mechanism illustrated in Figs. 5 and 6;

Referring now to the drawings, reference numerals 10, 12 and 14 indicate incoming conveyer sections which deliver commodities from the sources of supply to the present system. These conveyer sections may be of the gravity type or power driven, depending upon the requirements for successful delivery of commodities, taking into consideration limitations of the building and other controlling factors.

These conveyer sections deliver commodities to a short belt or live roller conveyer 16 which forms the connection between all incoming lines and the present system and aids in the control and proper delivery of commodities from the said incoming lines to the present system.

The conveyer 16 delivers the commodities received from the incoming lines to a dispatching conveyer 18 which is preferably, although not necessarily, of the gravity type. Adjacent the dispatching conveyer 18 is a dispatcher's station 20 where a dispatcher is located who is responsible, to a limited extent, for the operation of the system. That is to say, he regulates the delivery of commodities from the incoming lines to the present system and, when a sufficient quantity to constitute a consignment has been delivered, he operates certain stops for preventing further delivery.

He also operates a switch unit, presently to be described, which controls distribution of the commodities to the first, second, or third floor, as the case may be.

From the dispatching conveyer 18, the commodities proceed to a spacing unit 22 of the continuously operated automatic type which functions to regulate the space between succeeding commodities. The construction of this unit may be of any preferred form and is not a part of the present invention.

Having been properly spaced by operation of the unit 22, the commodities are delivered to a switch unit 24 which is controlled by the dispatcher at the dispatcher's station for routing the commodities over the main conveyers located on the first, second, or third floors. It will be evident, as the description proceeds, that the system may comprise only one main conveyer and, in that case, a switch unit will not be required.

In the drawings, I have shown a system located on three separate floors of a building on each of which there is a main conveyer. Thus, the main conveyer on the first floor is designated by the reference numeral 26, that on the second, 28, and that on the third, 30. Each of these is preferably of the belt type, although other equivalent constructions may be employed. A suitable elevator 32, of any desired type, is interposed between the switch unit 24 and the conveyer 30 on the third floor. Preferably, a short section 34 of gravity conveyer is provided to form a connection between the switch unit 24 and the conveyers 26, 28 and elevator 32.

Reference numeral 36 indicates, generally, a plurality of branch conveyers leading from the main conveyers. Each of the branch conveyers is governed by a suitable deflector 38, the control of which forms the essential subject matter of the present invention.

In Figs. 1 and 3, I have illustrated, in some detail, the elements of the part of the system which is located on the second floor. Adjacent the end of the conveyer 28, there is located a short section of gravity conveyer 40 which leads to an automatic spacing device 42 which operates to provide a fixed space between succeeding commodities. From the spacing device 42, the commodities proceed to a gravity conveyer 44 on and adjacent to which are located the various devices to be hereinafter described for actuating mechanism for controlling the deflectors 38 so that commodities of a predetermined size and shape will be deflected and distributed to a selected one of the branch conveyers 36.

In the parts of the system on the first and third floors, spacing devices, such as the device 42, will not be required but gravity roller sections 44 are installed on which are located the deflector operating devices, as described in connection with the system on the second floor.

The foregoing description is adequate to give those skilled in the art a complete understanding of the general features of construction and operation of the present conveyer system. I will proceed, therefore, to describe a single deflecting station and the associated mechanism for selectively deflecting commodities by their size or shape.

Figs. 5 and 6 are enlarged views, in plan and elevation, respectively, of a deflecting station such as that which is located on the second floor, as heretofore described. Therefore, in these figures the same general reference numerals are employed: 28 indicates the main conveyer; 36, a branch conveyer; 38 is a deflector; 40 is a short section of gravity conveyer; 42 is an automatic spacing device; and 44 is a section of gravity conveyer on and adjacent to which are located the mechanisms for operating the deflector.

The deflector 38 is connected to a post 46 suitably journaled in the frame of the conveyer and so positioned that the deflector will normally occupy a position across the conveyer, as shown in Fig. 5 from which position it may be pushed aside, by commodities which are destined for some succeeding station. This free swinging movement of the deflector may be effected by canting the post 46 or by the use of a suitable light spring, or equivalent means. The deflector may be held rigid in its position across the conveyer by a latch 48 which is operated by mechanism controlled by the characteristics of size or shape of the commodities to be deflected thereby, as will presently be fully described.

While I have selected for purposes of illustration a freely swinging deflector which may be latched in position across the conveyer, it is to be understood that my invention is not limited to this particular construction. The deflector may be constructed to swing on a horizontal pivot instead of vertical, or it may slide into position instead of swinging. Moreover, the deflector need not be of the type which offers passive resistance to the passage of the commodities; it may be constructed to engage the commodities and actively push them on to the selected branch conveyer. In general, therefore, it may be said that it is the purpose of the present invention to render a deflector, of whatever nature it may be, operative to transfer commodities from a main conveyer to a branch conveyer.

It will be understood that each of the deflectors 38 has an associated latch 48 and that the latches are selectively operable to render a selected deflector operative to transfer commodities to the branch line controlled thereby. The latches 48 are electrically operated by solenoids or electromagnets 50, the circuits of which are controlled by photo-electric cells.

Referring now to Figs. 5 and 7, it will be seen that I have mounted, at one side of the conveyer section 44, a plurality of illuminating devices 52 positioned to cast beams of light across the said conveyer section. In the present instance, I have shown three such illuminating devices, but any number may be employed, depending upon the number and arrangement of photo-electric cells. The particular construction of the illuminating devices is not important, but, in general, each consists of a housing within which is located one or more electric lamps and the housing being provided with a suitable lense for producing a beam of light.

On the side of the conveyer section 44 opposite the illuminating devices, I have mounted a plurality of photo-electric cells so arranged that the beams of light from the illuminating devices shine thereon. I have shown three housings designated by the reference numerals 54, 56 and 58 in each of which a pair of photo-electric cells is mounted. The housing 54 is secured to a support 60 by a slot and bolt connection 62 whereby said housing may be adjusted longitudinally of the conveyer. Similarly, the housing 58 is connected by a slot and bolt connection 64 to a bracket 66 secured to the support 60, whereby the said housing 58 may be vertically adjusted. The adjustability of these two housings will provide for varying the position and arrangement of the photo-electric cells in accordance with the size range of the commodities to be deflected. The third housing, 56, may also be adjustably mounted, if desired; but it is preferably fixed so as to provide a point with reference to which the other adjustments may be made. The illuminating devices will have similar adjustment so that the light beams will always be directed toward the photo-electric cells, in alinement with suitable apertures in the housings for said cells.

There are two photo-electric cells in each of the housings: those in the housing 54 being designated by the reference numerals 68 and 70, those in housing 56, by the numerals 72 and 74, and those in housing 58, by the numerals 76 and 78.

The cells in the housings 54 and 56 are positioned at the same level and the cells of each pair are separated by a suitable partition 80. The cells in the housing 58 are at different levels, as clearly indicated in the drawings, and at a desired elevation above the first-mentioned cells.

The six photo-electric cells are electrically connected into two groups of three cells each, the cells of each group being connected in series. The cells 68, 74 and 78 constitute one group and the cells 70, 72 and 76, the other. Each group of cells is electrically connected to an amplifying and relay mechanism which will be further described in the explanation of the wiring diagram, Fig. 11. These mechanisms are housed in boxes 82 and 84 suitably mounted on the frame of the conveyer, or at any other desired place.

The groups of photo-electric cells are so connected to their respective relays that one relay will be closed when its cells are dark and the other, when its cells are illuminated. For example, the group comprising the cells 68, 74 and 78 will normally close its associated relay when the cells are illuminated and the group comprising the cells 70, 72 and 76 will close its relay when the cells are dark. This will be more fully brought out in the description of the wiring diagram, Fig. 11.

The principle of operation of the structure thus far described will be clear from an inspection of Figs. 8, 9 and 10. Because of the arrangement of the photo-electric cells and their series connection into two groups, it will be evident that only a commodity of a certain size can satisfy the requirements for closing both relays to thereby close the circuit for the solenoid 50 which actuates the latch 48. Thus, in Fig. 8, the commodity A is too large; while it has interrupted the light beams going to the cells 70, 72 and 76 and thereby closed their relay, it has also interrupted the light beams for the cells 68 and 78 and, therefore, their relay will not be closed because all the cells of that group must be illuminated. In Fig. 9, the commodity B is too small; while it does not interrupt the light beams to the group 68, 74 and 78 and, therefore, their relay is closed, it has darkened only one cell of the other group, cell 72, and, therefore, the relay for that group will not be closed.

In Fig. 10 is shown a commodity C which is of exact size and shape to satisfy the conditions for closing both relays. The commodity C has interrupted the light beams to the cells 70, 72 and 76 whereupon the relay for that group is closed. The other cells 68, 74, and 78 are illuminated and, hence, their relay is also closed. When both relays are thus closed, the circuit controlling the solenoid 50 is completed and the latch 48 is operated to lock the deflector 38 in deflecting position.

The cells in the housings 54 and 56 are, in the foregoing description, positioned to be controlled by the length of the commodity and the cells in the housing 58, by its height. Any commodity which does not satisfy these conditions will simply pass on, pushing the deflector aside, and continue along the conveyer until it reaches a deflecting station at which the cells are so positioned that they will be influenced by that particular commodity, and by no other.

It will be evident that the photo-electric cells may be arranged in a great variety of ways so as to deflect commodities of irregular shapes and different sizes. In fact, the cells may be so arranged that a commodity of any irregular outline will close the relays and thereby complete a circuit to the latching solenoid. Thus, the invention will have a wide range of application in conveyer systems where it is desired to direct all commodities of common characteristics to a common destination.

Means is provided for preventing actuation of the latch 48 if the deflector is not in its normal position across the conveyer, as shown in Fig. 5. This means is in the form of a switch 86, having a contact member 88 which is carried by and moves with the deflector. The circuit through the switch 88 is complete only when the deflector is in the said normal position indicated in Fig. 5. The function of this switch is also more fully brought out in the description of the wiring diagram, Fig. 11.

Sufficient time must be allowed for the mechanisms thus far described to perform their respective functions and, therefore, it is advisable to incorporate in the system some form of means which will insure an adequate space, or time interval, between succeeding commodities. This is accomplished by the continuously operated automatic spacing device 42 which is shown in detail in Figs. 5 and 6.

The spacing device 42 includes a short section of gravity conveyer having guide pins 90 slidable in slots 92 in suitable guide plates 94. This conveyer section is reciprocated vertically by cams 96 on suitable cam-shafts 98 which receive their motion from any convenient source of power, such as a motor 100. Suitable speed-reducing gearing 102 is interposed between the motor and the cam-shafts and the said shafts are provided with intermeshing gears 104 to insure their uniform rotation and to overcome any dead-center position of the cams. By this mechanism, the conveyer section of the spacing device is periodically lowered to the position shown in Fig. 6 wherein the commodity is below the level of the adjacent conveyer section 44 and at rest against an enlarged roller 106. When the cams 96 are rotated through a half revolution from the position shown in Fig. 6, this conveyer section is elevated to the level of the section 44 and the commodity is free to roll onto said last-mentioned section. The speed-reducing device 102 is selected to reciprocate the spacing device at a desired rate to conform to the action of certain time relays which form part of the electric circuit controlling the deflector latch, as will be more fully brought out in the following description of the wiring diagram, Fig. 11.

Fig. 11 shows a complete wiring diagram for the solenoid 50 which actuates the deflector latch. Reference numerals 110 and 112 indicate the incoming power lines. This figure also shows a wiring diagram for the amplifying and relay mechanism associated with and operated by the groups of photo-electric cells. These mechanisms are fully described in the application of Martin J. Anderson, Serial Number 433,999, filed March 7, 1930. It is sufficient here to state that these mechanisms include an amplifying tube 114, a transformer 116, a sensitive relay 118, and a circuit control relay 120. It is unnecessary to discuss the theory of operation of photo-electric cells as the principle thereof is well known. When light falls upon the light-sensitive element of the cell, there is set up an electronic flow producing a very minute current which may be amplified to actuate the sensitive relays referred to.

As has been described, both the relays 120 must be closed to complete the circuit and this is accomplished only under the conditions shown in Fig. 10. Assuming the condition shown in Fig. 10, the two relays 120 will be closed thus completing a circuit from line 110 to line 112. This will energize a magnetic coil 122 of a two-pole contact type switch 124. The contactors of said switch being closed, a circuit is completed through a magnetic coil 126 of a timing relay 128. This timing relay may be of any preferred construction such as the type in which a piston is moved by a solenoid through a cylinder containing oil, the cylinder having a valve arrangement which may be adjusted to vary the retarding action of the oil and thereby vary the time interval of opening the relay. When the coil 126 is energized, the contactor 130 closes a circuit across the terminals 132 and 134 thus completing a circuit through a magnetic coil 136 of a two-pole contactor switch 138. Closing of these contactors completes the circuit to the solenoid 50. As will be clear from the diagram, the switch 86 must be closed before the circuit will be completed, which means that the deflector must be in position across the conveyer, as shown in Fig. 5. When the circuit to the solenoid 50 has thus been completed, the latch 48 will be projected upward to a position behind the deflector 38, locking the deflector in place. The commodity engages the deflector and is therefore transferred from the main conveyer to the branch.

It will be evident that the commodity C in Fig. 10 will occupy the position therein shown only for a brief instant and that as it advances, it will interrupt the beam of light to the cell 74 while permitting the beam to shine on the cell 70. This will disturb the predetermined conditions for operation of the relays 120 and these relays will instantly open. Thereupon the circuit through the magnetic coil 122 is opened and the contactors of the switch 124 will open, thus deenergizing the coil 126 of the time relay 128. However, the contactor 130 will still connect the terminals 132 and 134 and this position will be maintained for a period of from 3 to 60 seconds, depending upon the setting of the oil valve of said time relay. When this predetermined time interval has lapsed, the contactor 130 will open the circuit between terminals 132 and 134, thereby deenergizing the magnetic coil 136 of the switch 138. The circuit to the solenoid 50 is, therefore, broken and the latch 48 returns to normal inoperative position.

The foregoing steps are repeated for each succeeding commodity possessing the required dimensions for actuating the photo-electric cells as arranged in the example given. For each station in the system, there will be a different arrangement of cells so that only a commodity possessing the required characteristics will be effective to actuate said cells to cause latching of the deflector at that station.

The foregoing description will make my invention clear to those skilled in the art and it is believed that the many advantages will be readily appreciated. While I have described in great detail a practical embodiment of the invention, it is to be understood that I do not limit myself to these details and that the invention is susceptible of embodiment in other equivalent forms without departing from the spirit thereof and within the scope of the following claims.

I claim as my invention:

1. In a distributing system for classifying objects according to the width or height thereof as measured with respect to a fixed element, a pair of light responsive devices arranged closely adjacent each other, one of said devices being in a circuit which is operated by the illumination of said device, and the other of said devices being in another circuit which is operated by the obscuring of said device by the object, said circuits being interrelated and jointly controlling an actuating mechanism to effect the distribution of said objects according to the interception of light to the light responsive devices by the configuration of the object as measured by the width or height thereof.

2. In a distributing system for objects, a plurality of light responsive devices, certain of said devices being associated in one group and in a circuit which is operated by the illumination of said devices, and other of said devices being associated in another group and in a circuit which is operated by the obscuring of said devices by the object, said circuits jointly controlling the distributing of said objects according to their configuration.

3. In a distributing system for objects, a plurality of light responsive devices, arranged in pairs with the devices of each pair closely adjacent one another, said pairs of devices being disposed relative to each other in accordance with certain dimensional characteristics of the object, one device of each pair being in a circuit which is operated by the illumination of the device, and the other device of said pairs being in a circuit which is operated by the obscuring of said device, said circuits jointly controlling the distribution of the objects according to their characteristics.

4. In a distributing system for objects, a plurality of light responsive devices arranged in pairs, said pairs of devices being disposed relative to each other in accordance with the dimensions of the object, one device of each pair being in a circuit which is operated by the illumination of the device, and the other device of each pair being in a circuit which is operated by the obscuring of said device, and circuits jointly controlling the distribution of the objects according to their dimensions.

5. In a distributing system for classifying objects according to the width or height thereof as measured with respect to a fixed element, a pair of light responsive devices arranged closely adjacent each other, one of said devices being in a circuit which is operated by the illumination of said device, and the other of said devices being in another circuit which is operated by the obscuring of said device, and means for adjusting said light responsive devices in accordance with predetermined dimensional characteristics of the objects to be distributed, said circuits being interrelated and jointly controlling an actuating mechanism to effect the distribution of said objects in accordance with the variation of the light intercepted in accordance with the configuration of the object as measured by the width or height thereof.

6. In a conveying system for transporting objects, a main conveyer, a branch conveyer leading therefrom, means for diverting objects from the main conveyer to said branch conveyer, mechanism for actuating said diverting means, a plurality of light responsive devices arranged in pairs and associated with said main conveyer in advance of said branch conveyer, one device of each pair being in a circuit which is operated by the illumination of said devices, the other device of each pair being in a circuit which is operated by the obscuring of said devices, said circuits jointly controlling the operation of said mechanism by variation of the light intercepted in accordance with the configuration of the object for rendering the actuating mechanism operative.

7. In a conveying system, a main conveyer, a branch conveyer leading therefrom, means for transferring objects from said main conveyer to said branch conveyer, and means for actuating said transferring means including a plurality of light responsive devices, certain of said devices being associated in one group and in a circuit which is operated by the illumination of said devices, and other of said devices associated in another group and in a circuit which is operated by the obscuring of said devices by the object, said circuits jointly controlling the distributing of said objects according to their configuration.

8. In a conveying system, a main conveyer, a plurality of branch conveyers leading therefrom, means for transferring commodities from said main conveyer to said branch conveyers, and photo-electrically operated means for actuating a selected transferring means, said photo-electrically operated means including a plurality of light responsive devices, certain of said devices being associated in one group and in a circuit which is operated by the illumination of said devices, and other of said devices being associated in another group and in a circuit which is operated by the obscuring of said devices by the object, said circuits jointly controlling the distributing of said objects according to their configuration.

9. In a conveying system for transporting objects, a main conveyer, a branch conveyer leading therefrom, means for transferring objects from said main conveyer to said branch conveyer, a plurality of photo-electric cells positioned at one side of said main conveyer, illuminating means on the opposite side of said main conveyer for casting beams of light upon said photo-electric cells, said photo-electric cells being arranged in two groups, one of said groups being in a circuit which is operated by the illumination of said cells, and the other group being in a circuit which is operated by the obscuring said cells by the object, said circuits jointly controlling the operation of said transferring means.

JAMES R. PARKHILL.